United States Patent

Beall et al.

[11] Patent Number: 6,124,223
[45] Date of Patent: Sep. 26, 2000

[54] β-QUARTZ-BASED GLASS-CERAMICS

[75] Inventors: George H. Beall, Big Flats; Linda R. Pinckney, Corning, both of N.Y.

[73] Assignee: Corning Incorporated, Corning, N.Y.

[21] Appl. No.: 09/284,335

[22] PCT Filed: Nov. 7, 1997

[86] PCT No.: PCT/US97/20434

§ 371 Date: Apr. 9, 1999

§ 102(e) Date: Apr. 9, 1999

[87] PCT Pub. No.: WO98/22405

PCT Pub. Date: May 28, 1998

Related U.S. Application Data

[60] Provisional application No. 60/031,662, Nov. 21, 1996.

[51] Int. Cl.[7] .............................. C03C 10/02; C03C 10/04; C03C 10/12; G11B 5/73
[52] U.S. Cl. ........................ 501/4; 501/5; 501/8; 501/10; 65/33.1; 65/33.7; 428/694 ST
[58] Field of Search ................... 501/4, 5, 10, 8; 428/694 ST, 33.1, 33.7

[56] References Cited

U.S. PATENT DOCUMENTS

| | | | |
|---|---|---|---|
| 4,687,749 | 8/1987 | Beall | 501/5 |
| 5,391,522 | 2/1995 | Goto et al. | 501/4 |
| 5,476,821 | 12/1995 | Beall et al. | 501/10 |
| 5,491,116 | 2/1996 | Beall et al. | 501/5 |

*Primary Examiner*—Karl Group
*Attorney, Agent, or Firm*—Milton M. Peterson

[57] ABSTRACT

Nanocrystalline glass-ceramic materials based on β-quartz solid solution Mg-rich phases formed in the system $SiO_2$—$Al_2O_3$—$MgO$—$Li_2O$—$TiO_2$($ZnO$, $BaO$, $ZrO_2$, $P_2O_5$). Articles made from the glass-ceramic materials exhibit a crystal phase assemblage of a fine-grained, microstructure which is predominantly β-quartz, and at least one additional phase selected from enstatite and spinel, and having a composition which consists essentially of, in weight percent on the oxide basis, 40–65% $SiO_2$, 10–14% $Al_2O_3$, 5–25% $MgO$, 0.5–4% $Li_2O$, 5–15% $TiO_2$, and up to 5% $ZrO_2$, such that the sum of ($TiO_2$+$ZrO_2$) is at least 9% The glass-ceramide article is particularly useful for memory disk applications.

12 Claims, No Drawings

β-QUARTZ-BASED GLASS-CERAMICS

This application claims the benefit of U.S. Provisional Application Ser. No. 60/031,662 filed Nov. 21, 1996, entitled "β-Quartz-Based Glass-Ceramics".

FIELD OF THE INVENTION

The field is nanocrystalline glass-ceramics based on β-quartz solid solution and Mg-rich phases having predominantly very highly uniform, ultra-fine-grained microstructure of β-quartz and one or more phases selected from enstatite, spinel, and a Mg-containing phase with a hexacelsian structure.

BACKGROUND OF THE INVENTION

Glass-ceramic materials have found utility in such varied products as cookware, tableware, missile nose cones, protective shields and industrial applications. Recently, an interest has arisen in producing a rigid, glass-ceramic disk as a substrate upon which a layer of magnetic media can be deposited. The ultimate product is an information disk to cooperate with a head pad in a magnetic memory storage device.

U.S. Pat. No. 2,920,961 (Stookey) originally disclosed the preparation of glass-ceramic articles through the heat treatment of precursor glass bodies by the following three general steps: (1) a glass forming batch, customarily containing a nucleating agent, is melted; (2) the melt is simultaneously cooled to a temperature below the transformation range of the glass and an article is shaped therefrom; and, (3) the resulting glass article is heat treated at temperatures above the annealing point of the glass and, frequently, above the softening point of the glass for a sufficient length of time to cause the glass to crystallize in situ. The heat treatment can be so scheduled as to control the size and, in some instances, the identity of the crystals developed. Thus, the crystallization present in a glass-ceramic article can be the result of both the base composition of the precursor glass and the heat treatment the glass body is subjected to.

Glass-ceramic articles containing a spinel-type crystal phase were originally disclosed in U.S. Pat. No. 3,268,315 (Stookey). This patent discloses a method for forming a glass-ceramic material consisting essentially, expressed in terms of weight percent on the oxide basis, of 40–70% $SiO_2$, 14–34% $Al_2O_3$, 8–27% MgO, and 0.4–2.5% $Cr_2O_3$, with the total of these constituents constituting at least 95% by weight of the glass material, and subsequent glass-ceramic. The patent further discloses that the glassceramic exhibits a crystallization consisting essentially of at least one crystal phase selected from the group consisting of a magnesium metasilicate (enstatite) and a spinel. U.S. Pat. No. 4,687,749 (Beall) discloses glass-ceramic articles wherein enstatite constitutes the predominant crystal phase. These articles exhibit a high modulus of rupture, a use temperature in excess of 1200° C., and a high fracture toughness. They consist essentially in terms of weight percent on the oxide basis, of about 20–35% MgO, 2–12% $Al_2O_3$, 40–70% $SiO_2$, and at least one metal oxide in the indicated proportions selected from the group consisting of 0–2% $Li_2O$, 0–4% CaO, 0–12% SrO and 0–17% BaO, at least 0.5% $Li_2O$ being required when present alone and at least 1% SrO and/or BaO being required in the absence of $Li_2O$. The compositions include 5–15% $TiO_2$ and/or $ZrO_2$ for nucleation purposes.

Spinel-type crystal phase structures have also been disclosed in other patents such as, U.S. Pat. No. 3,873,329 (Beall); U.S. Pat. No. 3,936,287 (Beall et al.); U.S. Pat. No. 3,681,102 (Beall); U.S. Pat. No. 3,585,054 (Karstetter); U.S. Pat. No. 3,681,102 (Beall); U.S. Pat. No. 3,962,514 (Rittler); U.S. Pat. No. 4,059,454 (Reade); U.S. Pat. No. 4,867,750 (Pinckney); U.S. Pat. No. 5,028,567 (Gotoh et al.); and U.S. Pat. No. 5,079194 (Jean et al.). Also, U.K. Pat. No. 1,544,779 (Macmillan et al.).

One particularly desirable property of magnetic disk substrates is the ease with which such substrate can be fine polished. Information disks must be ultra-smooth to permit proper operation of a memory device. The difficulty in obtaining the desired ultra-smooth surface is a major concern in substrate production. One method which has been used in the past is to form glass-ceramic blanks into a desired shape, and then grind and polish the blanks to meet the smoothness requirements. This, of course, is a time-consuming, and hence expensive, operation.

U.S. Pat. No. 5,476,821 describes glass-ceramics having technical properties particularly well suited to producing an information disk substrate. As indicated above, these materials provide good fracture toughness and Knoop hardness values and a Young's modulus of $14-24 \times 10^6$ psi, and capable of taking a fine polish. More recently, U.S. Pat. No. 5,491,116 disclosed a glass-ceramic article having a Mg-rich pyroxene and spinel-type crystal phases and a composition at least 92% of which consists essentially of 35–60% $SiO_2$, 10–30% $Al_2O_3$, 12–30% MgO, 0–10% ZnO, 5–20% $TiO_2$, and 0–8% NiO.

The spinel- and enstatite+spinel-based glass-ceramics disclosed in the above two patents have been demonstrated to provide excellent substrates for rigid disk applications. Even though such materials are significantly easier to polish than those based predominantly on spinel, there is room for improvement in this area, and there continues to be a need for glass-ceramic materials with the same or improved technical properties, and which are also easy to polish.

Accordingly, it is the object of the present invention to provide modified glass-ceramics materials which provide the benefits of enstatite-spinel materials while providing greater ease of melting and polishing.

SUMMARY OF THE INVENTION

The glass-ceramic materials of the invention exhibit a crystal phase assemblage which is comprised of fine-grained, microstructures of β-quartz and at least one phase selected from enstatite and spinel, and having a composition which consists essentially of, in weight percent on the oxide basis, 40–65% $SiO_2$, 10–40% $Al_2O_3$, 5–25% MgO, 0.5–4% $Li_2O$, and 5–15% $TiO_2$. Depending on the desired phase assemblage, the glass-ceramic material may contain, 0–12% ZnO, 0–10% BaO, 0–5% $ZrO_2$, and 0–3% $P_2O_5$, such that the sum of zirconia and titania is greater than or equal to 9%. The glass-ceramic material may also contain other phases such as magnesium titanate and, when barium is present, hexacelsian solid solution.

As used herein, the term, "β-quartz" should be understood to mean P-quartz solid solution.

DETAILED DESCRIPTION OF THE INVENTION

A great deal of work has gone into the search for glass-ceramic materials that have all the desirable physical and microstructural properties of the materials described above (i.e., high strength and toughness and elastic modulus, excellent durability, nanocrystalline, smooth polish), yet that are compatible with fast, inexpensive finishing processes. In addition, it is desirable that the glass-ceramic materials be compatible with a wide range of forming processes, including casting, pressing, rolling, and floating. We have discovered a family of nanocrystalline glass-ceramics based on β-quartz solid solution and Mg-rich phases which possess very highly uniform, ultra-fine-grained microstructures of β-quartz accompanied by at least one phase selected from enstatite ($MgSiO_3$) and spinel ($(Mg,Zn)Al_2O_4$), and optionally, a magnesium titanate phase, or a hexacelsian solid solution ($BaAl_2Si_2O_8$ containing Mg) structure.

In particular, we have found one class of glass-ceramics that are highly crystalline and based on enstatite and β-quartz solid solution, which meet these requirements and thus are excellent candidates for information disk substrate application. These microstructures are stable over a wide range of heat treatment schedules, with no crystals larger than 0.1 micron (1000 Å). Moreover, these nanocrystalline microstructures provide extremely smooth polished surfaces, with average roughness measurements of 8 Angstroms (0.8 nm) or less as measured with atomic force microscopy (AFM) techniques.

The composition range (in weight per cent) of these glass-ceramics is as follows:

$SiO_2$ 40—65

$Al_2O_0$ 10–40

MgO 5–25

$Li_2O$ 0.54

ZnO 0–12

BaO 0–10

$TiO_2$ 5–15

$ZrO_2$ 0–5

$TiO_2$ +$ZrO_2$ greater than or equal to 9%.

In addition, the composition may contain up to 3% of $P_2O_5$, SrO, CaO, FeO, NiO, $Na_2O$, $K_2O$, $B_2O_3$, and other impurities, provided that the sum of these additional components does not exceed 6%.

The $TiO_2$ and $ZrO_2$ promote phase separation and nucleation. $TiO_2$ can be used alone or in combination with $ZrO_2$. Generally, $ZrO_2$, when used alone without $TiO_2$, makes the glass more difficult to melt and the glass-ceramics more coarse-grained. In all of these materials, β-quartz solid solution is the first primary phase to crystallize, followed by enstatite, and if barium is present, a hexacelsian solid solution. Spinel grows only at ceram temperatures exceeding 900° C. Lower levels of $TiO_2$ can also be used to produce beta-quartz but of coarser grain than with higher levels of titania. For optimum nucleation (i.e., fine grain size), we prefer higher levels of titania, or $TiO_2$+$ZrO_2$ greater than or equal to 9%. $Li_2O$ is used to promote controlled crystallization of the β-quartz solid solution. $Li_2O$ may be present in an amount in the range of 0.5–4%, preferably, 1–2.5%. The higher the amount of $Li_2O$, the coarser the grain structure.

The present glass-ceramics have ultra-fine grain sizes over a wide range of ceram temperatures, with no crystals over 0.1 micron in size. The spinel+β-quartz glass-ceramics, can be semi-transparent, while the enstatite+β-quartz glass-ceramics are opaque. Such nanocrystalline microstructures provide extremely smooth polished surfaces, with average roughness measurements of 8 Angstroms (0.8 nm) or less as measured with atomic force microscopy (AFM) techniques.

These glass-ceramics also possess mechanical properties that are comparable (and in some cases superior) to those of spinel or spinel+enstatite glass-ceramics. We have found that the β-quartz+enstatite materials have the best mechanical properties. Strength and toughness are increased as a result of the higher crystallinity of these materials. The increased strength and toughness is also a result of the lamellar twinning commonly present in enstatite. Twinning deflects cracks and absorbs energy, yielding abraded modulus of rupture (MOR) values in excess of 14,000 psi for these materials. Such strengths are remarkably high given the ultra-fine grain size of the crystalline microstructure.

The glass forming properties of the present glass ceramic materials are also improved over previously-described lithia-free compositions. The lower temperature melting of the present material allows for fewer platinum inclusions in the glass, and liquidus temperatures are similar to, or lower than those of earlier lithia-free compositions. We have found that the β-quartz-enstatite glass-ceramic lends itself to faster polishing than spinel-enstatite for example. This is probably a function of the lower hardness of β-quartz relative to spinel, as well as the higher crystallinity of the glass-ceramic, as well as the close match in hardness between P-quartz and enstatite.

EXAMPLES

Examples of the present glass-ceramics are given in Tables 1 and 2 below for, β-quartz-enstatite and β-quartz-spinel. The batch materials were thoroughly mixed together in order to secure a homogeneous melt, and subsequently placed into silica and/or platinum crucibles. The crucibles were placed into a furnace and the glass batch was then melted and maintained at temperatures ranging from 1500–1650° C. for times ranging from about 6–16 hours. The melts were thereafter poured into steel molds to yield glass slabs having dimensions of approximately ~10×20×1¼ cm (4"×8"×½"). Subsequently, those slabs were transferred immediately to an annealer operating at about 650–750° C. Samples were held at this temperature for about 1 hour and subsequently cooled overnight.

Test pieces representing each melt were prepared and heat treated to produce glass-ceramic (crystallized glass), samples. The test pieces were heated to 700–800° C., and held for 1–4 hours at that temperature to nucleate the glass, and then heated to 800– 1050°C., and held at that temperature for 2–4 hours to cause crystallization to occur on the nuclei. Table 2 also gives the various heat treatment schedules to which the precursor glass examples were subjected.

Also test pieces were ground, lapped and polished using standard techniques in order to study polishing times as well as to allow the surface and the microstructure to be studied using standard analytical techniques, such as scanning electron microscopy (SEM), replica electron microscopy (REM), and atomic force microscopy (AFM). Several relevant properties were measured on the samples such as the elastic or Young's modulus (E), the coefficient of thermal expansion (C.T.E.), the Knoop hardness (KHN),the fracture toughness ($K_{IC}$) and the modulus of rupture of an abraded sample (MOR). These properties are reported in Table 2.

TABLE 1

Glass-Ceramic Compositions and Properties

| Oxide | 1 | 2 | 3 | 4 | 5 | 6 | 7 | 8 | 9 | 10 | 11 |
|---|---|---|---|---|---|---|---|---|---|---|---|
| $SiO_2$ | 48.5 | 49.1 | 48.2 | 45.5 | 48.2 | 47.7 | 45.9 | 46.8 | 46.4 | 45.9 | 49.1 |
| $Al_2O_3$ | 27.0 | 25.0 | 23.6 | 24.5 | 22.7 | 22.5 | 22.5 | 22.5 | 22.7 | 22.5 | 16.2 |
| MgO | 9.0 | 11.4 | 15.5 | 11.8 | 16.4 | 16.2 | 18.0 | 18.0 | 14.1 | 14.0 | 17.1 |
| ZnO | 3.5 | 3.6 | 1.8 | 3.6 | 1.8 | 1.8 | 1.8 | 1.8 | 1.4 | 1.4 | 1.4 |
| $Li_2O$ | 2.0 | 1.8 | 1.8 | 1.8 | 1.8 | 1.8 | 1.8 | 0.9 | 1.8 | 1.8 | 1.8 |
| $TiO_2$ | 10.0 | 7.3 | 7.3 | 7.3 | 7.3 | 9.9 | 8.1 | 8.1 | 7.3 | 9.9 | 8.1 |
| $ZrO_2$ | — | 1.8 | 1.8 | 1.8 | 1.8 | — | 1.8 | 1.8 | 1.8 | — | 1.8 |
| BaO | — | — | — | 3.6 | — | — | — | — | 4.5 | 4.5 | 4.5 |

| Oxide | 12 | 13 | 14 | 15 | 16 | 17 | 18 | 19 | 20 | 21 | 22 | 23 | 24 |
|---|---|---|---|---|---|---|---|---|---|---|---|---|---|
| $SiO_2$ | 48 | 60.9 | 57.3 | 46.4 | 48.2 | 48.2 | 48.6 | 45 | 46.8 | 55.5 | 53.6 | 44.3 | 55.5 |
| $Al_2O_3$ | 22 | 12.7 | 14.5 | 22.7 | 20.9 | 22.7 | 22.7 | 18 | 18 | 13.3 | 14.5 | 34.8 | 16.4 |
| MgO | 10 | 13.6 | 16.4 | 18.2 | 18.2 | 16.8 | 16.8 | 19.8 | 18 | 19.4 | 18.2 | 6.8 | 16.4 |
| ZnO | 8 | 0.9 | 0.9 | 1.8 | 1.8 | 1.8 | 1.8 | 0.9 | 0.9 | 0.9 | 0.9 | 1.8 | 0.9 |
| $Li_2O$ | 2 | 1.8 | 1.8 | 1.8 | 1.8 | 1.4 | 0.9 | 1.8 | 1.8 | 1.2 | 1.8 | 2.7 | 1.8 |
| $TiO_2$ | 8 | 7.3 | 9.1 | 7.3 | 7.3 | 7.3 | 7.3 | 9.9 | 9.9 | 7.3 | 7.3 | 6.8 | 7.3 |
| $ZrO_2$ | 2 | 1.8 | — | 1.8 | 1.8 | 1.8 | 1.8 | — | — | 1.8 | 1.8 | 2.7 | 1.8 |
| BaO | — | 0.9 | — | — | — | — | — | 4.5 | 4.5 | — | 1.8 | — | — |
| $As_2O_5$ | — | — | — | — | — | — | — | — | — | — | — | 0.3 | — |

TABLE 2

Glass-Ceramic Compositions and Properties

| | 1 | 2 | 3 | 4 | 5 | 6 | 7 | 8 | 9 | 10 | 11 |
|---|---|---|---|---|---|---|---|---|---|---|---|
| H.T. | 800/1, 1030/2 | 800/1, 1000/2 | 800/1, 1000/2 | 800/1, 1000/2 | 800/1, 900/2 | 800/1, 900/2 | 800/1, 900/2 | 800/1, 900/2 | 800/1, 900/2 | 800/1, 900/2 | 800/1, 900/2 |
| Descrip. of fracture surface | adam-waxy | waxy | waxy-cherty | waxy-cherty | waxy | waxy | waxy | waxy-cherty | waxy | waxy | adam-waxy |
| Phases | β-quartz Spinel | β-quartz Spinel m.Enst. | β-quartz Enstatite Spinel | β-quartz Enstatite Hexacel.ss m.Spinel | β-quartz Enstatite Spinel | β-quartz Spinel Enstatite | β-quartz Enstatite | β-quartz Enstatite m.Spinel | β-quartz Enstatite m.Spinel | β-quartz Enstatite Glass | β-quartz Enstatite Glass | β-quartz Hexalcels.ss Enstatite |
| CTE ($10^{-7}$/° C.) | 38.5 | 45.7 | 53.9 | 52.5 | 58.2 | 57.8 | 62.0 | 61.6 | 55.9 | 55.5 | 62.2 |
| E($\times 10^6$ psi) | 17.3 | 18.3 | 19.3 | 18.2 | 19.1 | 19.2 | — | 19.2 | 18.3 | 18.1 | 18.7 |
| Hardness | 750 | 780 | 795 | 760 | 765 | 770 | 800 | 800 | 750 | 750 | 775 |
| MOR (abr) ($10^3$ psi) | 13.0 | 13.5 | 15.0 | 14.0 | 13.0 | 13.5 | — | 14.5 | 11.0 | 12.0 | 13.5 |
| $K1_c$ (MPa m½) | 1.2 | 1.2 | 1.4 | 1.3 | 1.3 | 1.3 | — | 1.4 | 1.3 | 1.2 | 1.3 |

| | 12 | 13 | 14 | 15 | 16 | 17 | 18 | 19 | 20 | 21 | 22 | 23 | 24 |
|---|---|---|---|---|---|---|---|---|---|---|---|---|---|
| H.T. | 800/1, 875/2 | 800/1, 1000/2 | 800/1, 1000/2 | 800/1, 900/2 | 800/1, 900/2 | 800/1, 900/2 | 800/1, 900/2 | 800/1, 900/2 | 800/1, 900/2 | 775/1, 1000/2 | 775/1, 1000/2 | 725/4, 850/4 | 800/1, 1000/2 |
| Descr.* | waxy | adam | adam | waxy | waxy | cherty | cherty | adam | adam | waxy-cherty | waxy-cherty | adam | adam-waxy |
| Phases | β-quartz Spinel ss m.Enst | β-quartz Enstatite | β-quartz Enstatite m.β-spod | β-qtz (less) Enstatite | β-quartz Enstatite | β-quartz Enstatite | β-quartz Enstatite | β-qtz(less) Enstatite Hexacels | β-quartz Enstatite Hexacels | β-quartz Enstatite tr.β-spod | β-quartz Enstatite | β-quartz Spinel | β-quartz Enstatite |
| CTE ($10^{-7}$/° C.) | — | 51 | 53 | 63 | 64.1 | 60 | 58.5 | 67.5 | 64.3 | 63 | 64 | <40 | 55.0 |
| E($\times 10^6$ psi) | — | 16 | 17 | 19.1 | 19.4 | 17.8 | 17.2 | 20.5 | 19.3 | 19 | 18 | — | 18.5 |
| Hardness | — | — | — | 850 | — | 750 | 800 | 830 | 800 | 780 | 830 | — | 770 |
| MOR (abr, $10^3$ psi) | — | 13 | 15 | — | — | — | — | — | — | 17 | 16 | — | 15.0 |
| $K1_c$ (MPa m½) | — | 1.2 | 1.3 | 1.4 | 1.3 | 1.4 | 1.45 | 1.35 | 1.3 | 1.5 | 1.4 | — | 1.35 |

*Ultra Fine → → → → → → → → → → Fine-Grain
Glassy -- Adamantine -- Waxy -- Cherty A. β-quartz-Enstatite: The key to obtaining this phase assemblage is maintaining a suitably high ratio of MgO to $Al_2O_3$. The addition of transition elements such as Ni or Fe also strongly promotes the crystallization of the enstatite phase. These materials are typically highly crystalline (>75%) and provide the highest strength and toughness. Abraded M.O.R. values of 14,000 psi and fracture toughness values of 1.3 MPa m$^{1/2}$ are routinely obtained. While these materials are typically the "coarsest-grained" of those described in this report, with waxy fracture surfaces, they are extremely stable over a wide ceramming range, with no crystals over 0.1 micron in size. Polished materials have yielded an average roughness of 5–8 Å (0.5–0.8 nm) as measured by atomic force microscopy (AFM) techniques. The addition of even low levels (4 wt %) of BaO tends to promote the crystallization of the hexacelsian solid solution phase, at crystallization temperatures over 900° C. This phase increases the overall thermal expansion of the materials. The glass-ceramics are finer-grained than the β-quartz+enstatite materials, and typically contain enstatite as well.

B. β-quartz-Spinel solid solution: Spinel is favored over enstatite by higher ratios of $Al_2O_3$ to MgO and by increasing the amount of ZnO (which strongly prefers entering the spinel or β-quartz structures.) Due to the ultrafine grain size of the spinel crystals—usually less than 500 Å—these are the finest-grained glass-ceramics described in this report. They have glassy to adamantine fracture surfaces and typically are semi-transparent.

It will be recognized that, whereas the above description is drawn to laboratory practice, the glasses operable in the invention described herein can be melted in large scale/commercial melting tanks and formed into desired shapes using conventional glass melting techniques and forming processes. It is only necessary that the compositions be fired at sufficiently high temperatures and for a sufficient length of time to produce a homogeneous melt. Thereafter, the melt is cooled and simultaneously shaped into a glass body which is customarily then annealed.

While various heat-treatment cycles and compositions may be used to produce different microstructures or crystal phase assemblages, all of the Examples shown in Table 1 produced β-quartz crystals as a predominant crystal phase. The Mg-containing phases provide critical mechanical properties.

It should be noted that, the properties which the inventive glass-ceramic material disclosed herein possesses render it eminently suitable for use in a magnetic memory storage device comprised of a head pad and rigid information disk. Specifically, the glass-ceramic is used in the rigid information disk as the rigid disc substrate which possesses a layer of magnetic media on its surface. In other words, the substrate would be comprised of the inventive glass-ceramic material exhibiting the crystal phase assemblage comprised predominantly of β-quartz crystals and a Mg-phase.

Based on its overall combination of properties indicated in Table 2, Example 24 is deemed to be the most preferred composition for memory disk substrate application. Examples 21 and 22 have the best mechanical properties but are slightly coarser grained than Example 24, and are therefore, slightly less desirable for substrate applications. For memory disk applications, the substrate is desirably sufficiently rigid to prevent distortions. Preferably, the elastic modulus (E) of such substrates is at least $15 \times 10^6$ psi

We claim:

1. A glass-ceramic article exhibiting a crystal phase assemblage which is comprised of fine-grained, microstructures of β-quartz and at least one phase selected from enstatite and spinel, the article having a composition which consists essentially of, in weight percent on the oxide basis, 40–65% $SiO_2$, 10–40% $Al_2O_3$, 5–25% MgO, 0.5–4% $Li_2O$, 5–15% $TiO_2$, and up to 5% $ZrO_2$, such that the sum ($TiO_2+ZrO_2$) is at least 9%.

2. The glass-ceramic article according to claim 1, further comprising 0–10% ZnO, 0–10% BaO, and 0–3% of random oxides selected from the group consisting of $P_2O_5$, $B_2O_3$, SrO, CaO, NiO, FeO, $Na_2O$, and $K_2O$, provided that the sum of these random oxides does not exceed 6%.

3. The glass-ceramic according to claim 2, comprising 2–10% BaO, and further comprising a hexacelsian solid solution.

4. A glass-ceramic article according to claim 1 wherein the microstructure exhibits crystals having dimensions less than about 1000 Å.

5. The glass-ceramic article according to claim 1 wherein the crystal phase assemblage comprises β-quartz and enstatite.

6. A method for making a glass-ceramic article which comprises the steps of a) melting a batch for a glass composition at least 92% of which consists essentially, expressed in terms of weight percent on the oxide basis, of 40–65% $SiO_2$, 10–40% $Al_2O_3$, 5–25% MgO, 0–10% ZnO, 5–15% $TiO_2$, 0–5% $ZrO_2$, and 0.5–4% $Li_2O$;

b) heating the glass article to a temperature range of about 750–850° C.;

c) maintaining the temperature for a time sufficient to cause the article to obtain a high degree of nucleation;

d) heating the glass article to a temperature range about 850–1100°C.; and e) maintaining the temperature for a time sufficient to cause the article to crystallize in situ forming a crystallized glass article which exhibits crystal phase assemblage comprised predominantly of uniformly-sized, fine-grained, microstructures of β-quartz and at least one phase selected from the group consisting of enstatite and spinel.

7. The method of claim 6 wherein the microstructure further comprises at least one minor phase selected from a Mg-titanate phase, and a hexacelsian solid solution.

8. The method according to claim 6 wherein the microstructures exhibit dimensions less than about 1000 Å in diameter.

9. The method according to claim 6 wherein the period of time sufficient to cause the article to obtain a high degree of nucleation is at least 1 hour and the period of time sufficient to cause the articles to crystallize in situ ranges between about 1–4 hours.

10. A rigid information disk for use in a magnetic memory storage device consisting essentially of a substrate with a coating of magnetic media on a surface thereof, wherein the substrate is comprised of a glass-ceramic material having a crystal phase assemblage comprised predominantly of fine-grained, microstructures β-quartz and at least one phase selected from enstatite and spinel, the article having a composition which consists essentially of, in weight percent on the oxide basis, 40–65% $SiO_2$, 10–40% $Al_2O_3$, 5–25% MgO, 0.5–4% $Li_2O$, 5–15% $TiO_2$, and 0–6% $ZrO_2$ such that the sum of ($TiO_2+ZrO_2$) is at least 9%.

11. A rigid information disk according to claim 10 wherein the microstructures exhibit dimensions less than about 1000 Å.

12. A rigid information disk according to claim 10, wherein the microstructure further comprises at least one minor phase selected from a Mg-titanate phase, and a hexacelsian solid solution.

* * * * *